United States Patent [19]

Robson

[11] Patent Number: 4,944,072
[45] Date of Patent: Jul. 31, 1990

[54] PROFILED FASTENERS

[76] Inventor: Peter M. Robson, Les Anguettes, Clos du Port, La Rocque, Grouville, Jersey C.1, Great Britain

[21] Appl. No.: 368,775

[22] Filed: Jun. 20, 1989

[30] Foreign Application Priority Data

Jun. 25, 1988 [GB] United Kingdom ............... 8815164
Nov. 8, 1988 [GB] United Kingdom ............... 8826131

[51] Int. Cl.$^5$ .......................................... B65D 33/16
[52] U.S. Cl. ...................................... 24/587; 24/576; 383/65
[58] Field of Search .............. 24/587, 576, 399, 400; 383/63, 65

[56] References Cited

U.S. PATENT DOCUMENTS

| 2,715,759 | 8/1955 | Pous . | |
|---|---|---|---|
| 2,780,261 | 2/1957 | Svec et al. | 383/65 |
| 2,789,609 | 4/1957 | Post | 383/65 |
| 2,823,720 | 2/1958 | Svec et al. | 383/65 |
| 2,823,721 | 2/1958 | Svec et al. | 383/65 |
| 2,978,769 | 4/1961 | Harrah | 24/587 |
| 3,416,585 | 12/1968 | Staller | 24/587 |
| 3,495,306 | 2/1970 | Eichberg . | |
| 4,516,268 | 5/1985 | Kamp | 383/63 |
| 4,532,652 | 7/1985 | Herrington | 383/63 |
| 4,736,451 | 4/1988 | Ausnit | 24/587 |
| 4,817,188 | 3/1989 | Van Erden | 24/587 |

FOREIGN PATENT DOCUMENTS

| 567093 | 5/1958 | Belgium . |
|---|---|---|
| 901041 | 1/1954 | Fed. Rep. of Germany . |
| 2159353 | 11/1971 | Fed. Rep. of Germany . |
| 1066917 | 6/1954 | France . |
| 1202081 | 1/1960 | France . |
| 1402674 | 5/1965 | France . |
| 1564720 | 3/1969 | France . |
| 2022865 | 8/1970 | France . |
| 37287 | 6/1959 | Luxembourg . |
| 778558 | 7/1957 | United Kingdom . |
| 797683 | 7/1958 | United Kingdom . |
| 899875 | 6/1962 | United Kingdom . |
| 935967 | 9/1963 | United Kingdom . |
| 962701 | 7/1964 | United Kingdom . |
| 1047928 | 11/1966 | United Kingdom . |
| 1101491 | 1/1968 | United Kingdom . |
| 1187640 | 4/1970 | United Kingdom . |
| 1211579 | 11/1970 | United Kingdom . |
| 1532611 | 11/1978 | United Kingdom . |
| 2017813 | 10/1979 | United Kingdom . |

Primary Examiner—Victor N. Sakran
Attorney, Agent, or Firm—Renner, Otto, Boisselle & Sklar

[57] ABSTRACT

Profiled bead and recess fasteners have mating, complementary parts. One part has a bead which engages in a recess in the other. When engaged, there is resistance to separation under tension forces. The recess has an entrance for the bead which is smaller in section than the bead but which is adjustable by local deformation to pass the bead by flexure of one side of the recess by the bead which comes out of contact with the other side. The local deformation can be produced by finger pressure and so the fastener can be operated without the usual slider, although a slider can be provided for some purposes.

23 Claims, 12 Drawing Sheets

PROFILED FASTENERS

BACKGROUND TO THE INVENTION

This invention relates to profiled, bead and recess fasteners, such as may be made by extrusion of plastics material to substitute for the slide type fastener with interlocking teeth attached to stringers that can be sewn to edges e.g. of garments required to be releasably joined. Such profiled fasteners are to be found on plastic document wallets.

It is a problem with such fasteners that, largely on account of the flexible nature of the material of which they are made, they are relatively easy to spring open. To provide greater resistance against such springing open, while leaving the fastener easy to open intentionally, more complicated cross sectional latching arrangements have been proposed. These, however, require correspondingly complicated sliders. While such complicated sliders are realisable theoretically, in practise it is difficult, if not impossible, to produce them easily and inexpensively to the right tolerances, especially in the smaller sizes of fastener.

SUMMARY OF THE INVENTION

The present invention provides an improved fastener which can be made adequately secure against unintended springing open and one which can be opened and closed without the need for a slider, although a slider might be provided while retaining the other improvements.

The invention comprises a profiled bead and recess fastener comprising mating, complementary parts of which one part has a recess and the other part has a bead which engages in the recess to maintain the fastener closed against tension forces so directed as to tend to separate the two parts, the recess having, in cross section, an entrance for the bead, which is smaller in cross section than the bead cross section whereby to retain the bead in the recess, the cross section of said entrance being adjustable by local elastic deformation to permit the bead to enter or leave the recess laterally, such deformation comprising flexure of one side of the recess by the bead whilst the bead comes out of contact with the other side of the recess.

Such flexure may be effected by finger pressure on the bead part. Said finger pressure may cause the bead part to rock on the recess part to press the bead against the said one side of the recess.

Said bead part may comprise a lever which rocks on the recess part and carries the bead, such rocking urging the bead against said one side of the recess and out of contact with the other side of the recess whereby to adjust the cross section of the entrance so that the bead can be withdrawn, continued rocking then withdrawing the bead from the recess. Said lever may have a lever arm adapted to be pushed by finger pressure towards the recess part to effect the rocking which opens the entrance to the recess. Said lever may otherwise, or in addition, have a lever arm adapted to be lifted by finger pressure away from the recess part to effect the rocking which opens the entrance to the recess.

Said finger pressure may cause the bead part to slide on the recess part, however, to press the bead against the said one side of the recess.

The bead and entrance to the recess may be so shaped that pushing the bead towards the recess against the said entrance opens the entrance to admit the bead.

At least parts which move over each other in the actions of opening and closing may have low friction.

The fastener may be an elongate, flexible fastener with a continuous, uniform cross section, opening of which, after a start thereon by said recess deformation, is continued progresssively by pulling the two parts apart, the bead at the position where the fastener is half open holding open the entrance to the recess whereby the next adjacent bead portion can be pulled out.

There may be at least one break, however, in the continuity of the cross section along the fastener whereby the said progressive opening is arrested.

The fastener may, however, be an elongate flexible fastener which is segmented lengthwise so that the opening of any segment does not open the entrance of an adjacent segment sufficiently to allow the bead therein to come out. The fastener may be segmented lengthwise by notches or by inclusions of reduced-modulus material.

A fastener may have at least one lengthwise section at any part of which local elastic deformation to permit the bead to leave the recess laterally cannot be effected except by, at an adjacent part, the bead holding open the entrance to the recess, so that opening of the fastener cannot be started within said section.

The fastener may be made by extrusion, especially by extruding a plastics material which may then be drawn after extrusion. The fastener may be co-extruded from different materials as, for example, from regular and low friction and/or low modulus/high modulus materials so as to arrange for desired frictional/flexural properties at different parts of the cross section.

The fastener may be intended for use as a closure for textiles, having attachment edges, one on each of said parts, for connecting to textiles. The fastener may be adapted for sewing to textiles by the attachment edges being adapted for needle penetration, and being of reasonable strength, possibly being reinforced with textile thread or ribbon, and may have a sewing guide by which machine sewing is facilitated.

The attachment edges may also be profiled to accept and grip a textile selvedge, and they may be adhesive.

An elongate fastener may have at least one closed end.

A fastener may have two or more recesses and/or two or more beads, which bead or any one of which beads can be engaged in the recess or any one of the recesses, whereby to produce an adjustable width fastening.

The fastener may comprise auxiliary bead and recess means assisting in maintaining the fastener closed under tension forces but separable together with the first mentioned bead coming out of its recess. Said auxiliary bead and recess means may be readily engageable and form pilot engagement means facilitating engaging the first mentioned bead with its recess.

Although the fastener may be fashioned as a sliderless elongate fastener, it may also be realised as a slider fastener having slider means running along the fastener effecting said local elastic deformation. Said slider means may isolate the length of closed fastener on one side from the effect of the open fastener on the other side so as to maintain the slider closed on the said one side.

The fastener may be, in another aspect, elongate but rigid against twisting about its length. Such a fastener may be incorporated on the edges of, or even integral with, structural panels, beams and the like or, in circular form, as a can closure. Opening and closing of the fastener may be progressive, as for the flexible fasteners aforementioned, or the entire length of the recess may be opened at once so that the entire length of the bead comes out of it at once.

The fastener—in whatever form—may incorporate guard means protecting the parts against unintentional separation.

BRIEF DESCRIPTION OF THE DRAWINGS

Embodiments of fasteners according to the invention will now be described with respect to the accompanying drawings, in which:

FIGS. 1 to 10 are of one embodiment:

FIGS. 6 to 8 are of another embodiment:

and FIGS. 9 to 18 illustrate features of further variants:

DETAILED DISCLOSURE OF THE PREFERRED EMBODIMENT

The figures illustrate profiled bead and recess fasteners comprising mating, complementary parts 11,12 of which one part has a recess generally shown as 14, and the other part has a bead generally shown as 13 which engages in the recess 14 to maintain the fastener closed against tension forces so directed as to tend to separate the two parts 11,12, the recess 14 having in cross section, an entrance 10 for the bead which is smaller in cross section than the bead cross section whereby to retain the bead 13 in the recess 14, the cross section of said entrance being adjustable by local elastic deformation to permit the bead 13 to enter or leave the recess 14 laterally, such deformation comprising flexure of one side 14' of the recess 14 by the bead 13 whilst the bead 13 comes out of contact with the other side 14" of the recess 14.

Such flexure is effected by finger pressure on the bead part 13 which causes the bead 11 to rock on the recess part 12 to press the bead 13 against the said one side 14' of the recess 14.

The bead part 11 comprises a lever 17 which rocks on the recess part 12 or, in the embodiment illustrated in FIGS. 1 to 5, on the bead part 11 while attached to the recess part 12, and carries the bead 13, such rocking urging the bead 13 against the side 14' of the recess 14 and out of contact with the other side 14" of the recess 14 whereby to adjust the cross section of the entrance 10 so that the bead 13 can be withdrawn, continued rocking then withdrawing the bead 13 from the recess 14. The lever 17 has a lever arm 17' adapted to be pushed by finger pressure towards the recess part 12 to effect the rocking which opens the entrance 10 to the recess 14. The lever 17 may otherwise, or in addition, have a lever arm 17" (FIG. 9) adapted to be lifted by finger pressure away from the recess part 12 to effect the rocking which opens the entrance to the recess 14.

Figure 14:
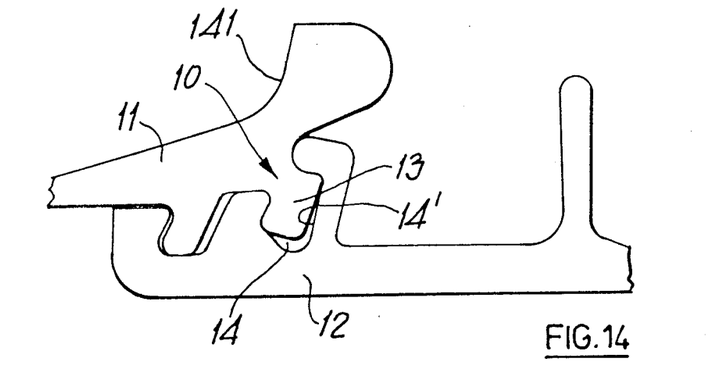
FIG. 14 is a cross section of a yet further embodiment.

In the embodiment illustrated in FIG. 14, finger pressure at 141 causes the bead part 11 to slide on the recess part 12, however, to press the bead 13 against the side 14' of the recess 14.

In all embodiments, the bead 13 and entrance 10 to the recess 14, are so shaped that pushing the bead 13 towards the recess 14 against the said entrance 10 opens the entrance to admit the bead 13—the bead 13 in effect cams the side 14' of the recess 14 aside.

Figure 9:
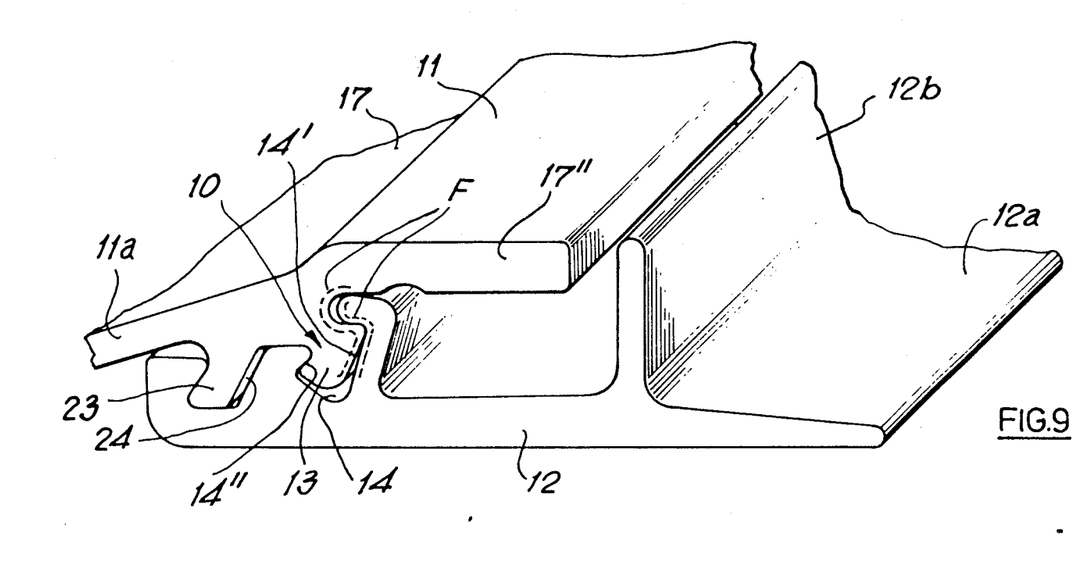
FIG. 9 is a perspective view of a further embodiment, showing particularly the cross section.

At least those parts of the fastener which move over each other in the actions of opening and closing namely the surfaces of the bead 13 and recess 14 indicated by broken lines 'F'—see FIG. 9—have low friction.

The fasteners illustrated in FIGS. 1 to 5 and 9 are elongate, flexible fasteners with continuous, uniform cross sections, opening of which, after start thereon by said recess deformation, is continued progressively by pulling the two parts 11,12 apart, the bead 13 at the position where the fastener is half open holding open the entrance 10 to the recess 14 whereby the next adjacent bead portion can be pulled out.

There may be at least one break, however, in the continuity of the cross section along the fastener whereby the said progressive opening is arrested.

Figure 7:
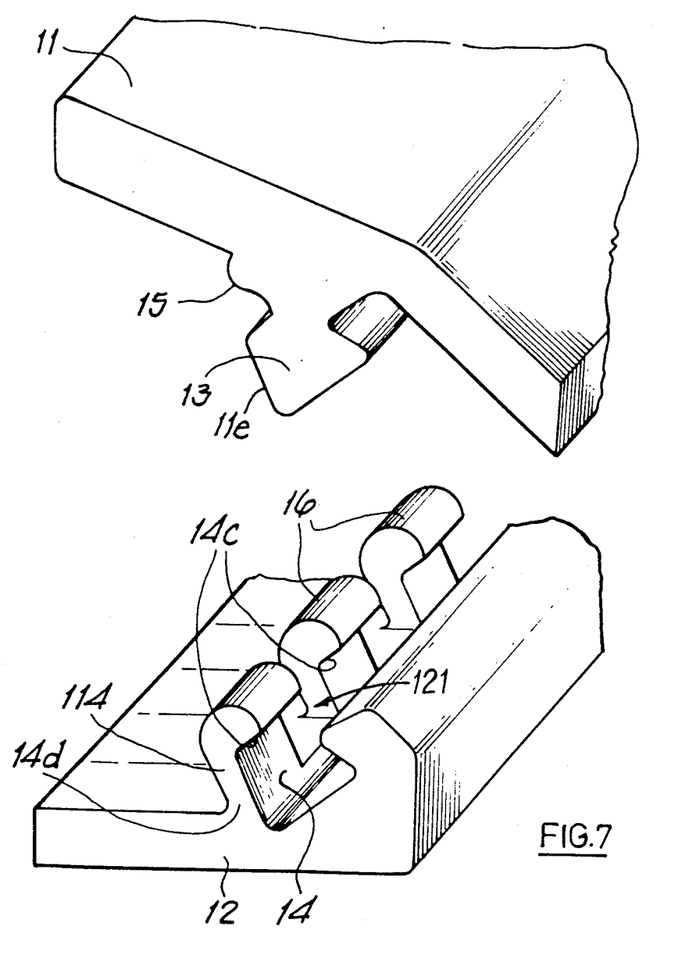
FIG. 7 a perspective view showing the two parts of a fastener like that of FIG. 6, but segmented.
Figure 10:
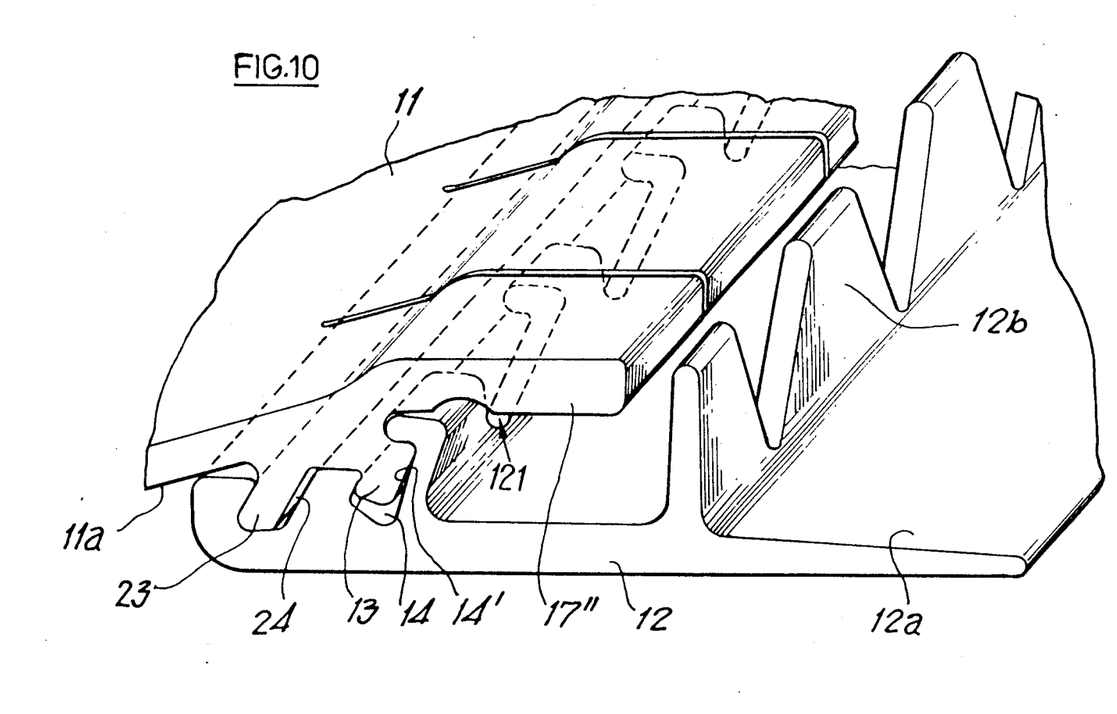
FIG. 10 is a view like FIG. 9 of a varient of the embodiment thereof.

The fastener, as shown in FIGS. 7 and 10, is an elongate flexible fastener which is segmented lengthwise, which is to say has a plurality of regularly-distributed breaks in its cross sections, so that the opening of any segment does not open the entrance of an adjacent segment sufficiently to allow the bead 13 therein to come out. The fastener is segmented lengthwise by notches 121. However, it may also be segmented by inclusions of reduced-modulus material at the locations of the notches 121.

Figure 11:
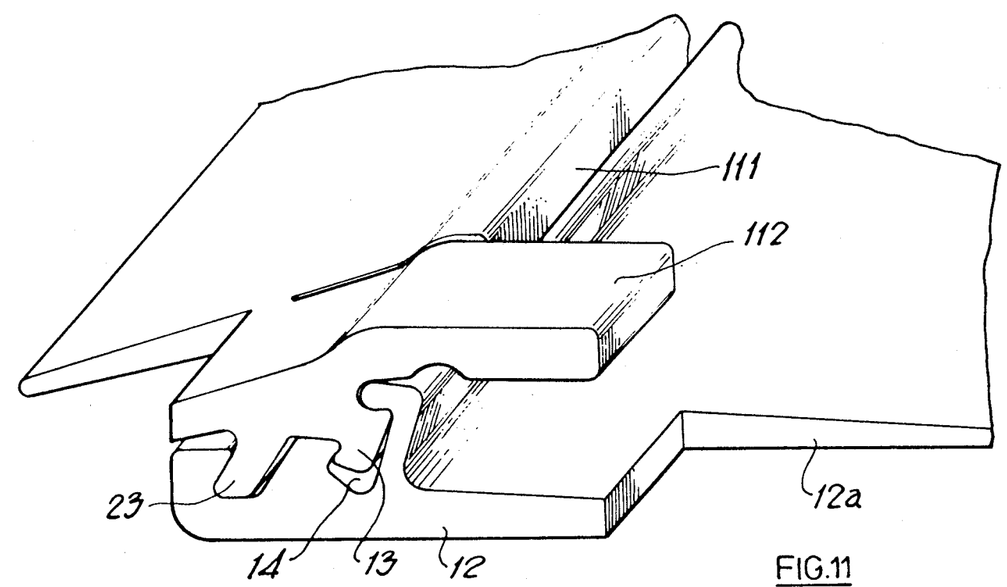
FIG. 11 is a view like FIG. 9 of a further embodiment thereof.

This fastener illustrated in FIG. 11 has a lengthwise section 111 at any part of which a local elastic deformation to permit the bead 13 to leave the recess 14 laterally cannot be effected except by, at an adjacent part, the bead 13 holding open the entrance to the recess 14 so that opening of the fastener cannot be started within said section. This fastener can be opened only from the lever segment 112, which is constructed as described in connection with FIG. 9.

The illustrated fasteners may be made by extrusion, especially by extruding a plastics material such for example as polypropylene, nylon or polyester, which may then be drawn after extrusion to extend its length, reduce its cross section and increase its strength against plastic deformation under tension. The fastener may be co-extruded from different materials as, for example, from regular and low friction and/or low modulus/high modulus materials so as to arrange for desired frictional/flexural properties at different parts of the cross section. Thus for example the shaded parts of the recess part 12 of FIG. 9, corresponding to the dashed lines thereon, can be made of a low friction plastic co-extruded with another material for the rest of the cross section.

This can be of particular importance also in connection with achieving the right balance of flexural properties.

Thus the side 14' of the recess that is elastically deformed to open the recess to admit or release the bead 13 should be relatively rigid, so as not to deform itself under tension forces tending to separate the two parts of the fastener, yet have a flexible root, so that it can be bent aside, to open the recess, under local deformation.

Whilst the segmentation of the elongate fastener has been described in regard to limiting the ability to pull the same open after a start, segmentation may also be used to control flexibility so, for example, as to provide that a fastener can be bent in one way or another, or twisted, or that a fastener can resist bending in one fashion or another, or can resist twisting, while at the same time retaining such flexibility where necessary and rigidity where necessary to open or close by intentional local deformation or by pulling apart after a start thereon, and not unintentionally.

The fastener can be used as a closure for textiles, having attachment edges 11a,12a on parts 11 and 12 respectively, for connecting to textiles. The fastener can be sewn to textiles, the attachment edges 11a,12a being adapted for needle penetration, and being of reasonable strength, possibly being reinforced with textile thread or ribbon. The edges 11a,12a may have a sewing guide by which machine sewing is facilitated.

Such sewing guide may be no more than a sighting line but may constitute a ridge such as the ridge 12b, FIGS. 9 and 10 which can be run against the presser foot of a sewing machine.

Figure 15:
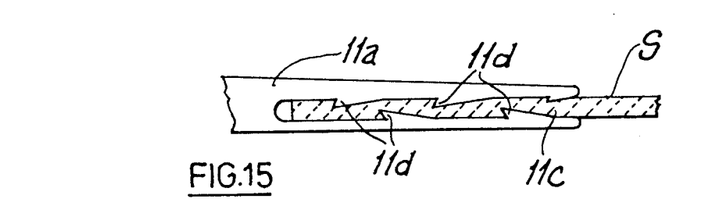
FIG. 15 is a cross section of an attachment edge.

The attachment edges 11a,12a, which may be adhesive, can also be profiled to accept and grip a textile selvedges, as illustrated in FIG. 15, for attachment to a textile otherwise than by sewing, or to be reinforced by sewing.

The edge 11a shown in FIG. 15, has a slit 11c with sharks' teeth ribs 11d into which the textile selvedge S is inserted. The inner faces of the slit 11c may be coated with a contact or other suitable adhesive.

Any of the elongate fasteners described may have at least one closed end.

Figure 8:
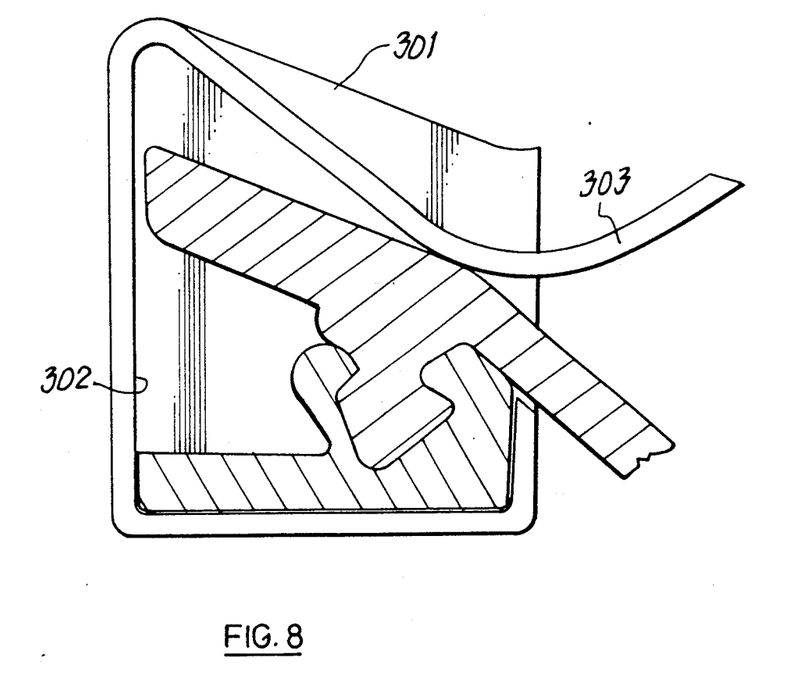
FIG. 8 is a cross sectional view of an end stop for an arrangement such as is illustrated in FIGS. 6 and 7.

Such end may be closed by welding or otherwise joining the two parts 11,12 together, or by fixing them in a common terminal such as end stop terminal 301 of FIG. 8 which has an enclosure 302 within a spring member 303 urging the two parts 11,12 together.

Figure 16:
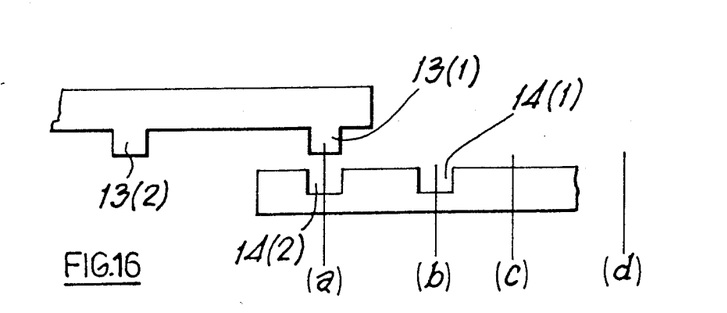
FIG. 16 is a cross section of another variant.

Fasteners generally as described above may have two or more recesses and/or two or more beads, which beads or any one of which beads can be engaged in the recess or any one of the recesses, whereby to produce an adjustable width fastening. A fastener of FIG. 16 is shown as diagrammatically having two recesses 14(1),14(2) and two beads 13(1),13(2) and which therefore has four fastening positions, bead 13(1) going into either recess 14(1) or recess 14(2), and then bead 13(2) going into recess 14(1) or 14(2) whereby to position bead 13(1) at one or other of the four positions (a), (b), (c) or (d) indicated.

The fastener shown in FIG. 9, like that shown in FIGS. 1 to 5, comprises an auxiliary bead 23 and recess 24 means assisting in maintaining the fastener closed under tension forces but separable together with the first mentioned bead 13 coming out of its recess 14. The FIG. 9 auxiliary bead and recess means 23,24, however, are readily engageable and form a pilot engagement which facilitates engagement of the primary bead 13 with its recess 14.

Figure 12:
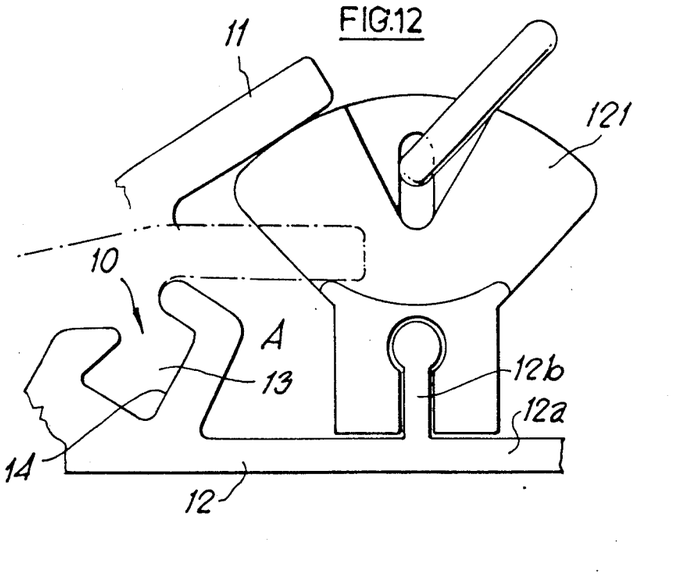
FIG. 12 is a cross section of a slider arrangement for a variant of the embodiment of FIG. 9.
Figure 13:
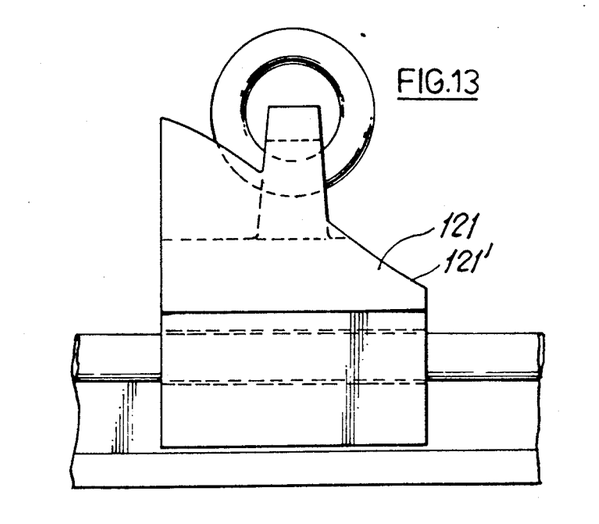
FIG. 13 is a view in the direction of arrow A of FIG. 12.

Although the fastener may be fashioned as a sliderless elongate fastener, it may also be realised, as shown in FIGS. 12 and 13, as a slider fastener having slider means 121 having a cam face 121' running along the fastener effecting said local elastic deformation. Said slider means 121 effectively isolates the length of closed fastener on one side from the effect of the open fastener on the other side so as to maintain the fastener closed on the said one side.

Unlike conventional fasteners with interlocking teeth, the slider for which positively engages over both sets of teeth, the slider 121 need engage over only one part—as illustrated, the recess part 12—of the fastener, merely acting as a cam to locally operate the bead part 11 to locally deform the recess part to open the recess entrance 10 and urge the bead 13 out of the recess 14.

Figure 17:
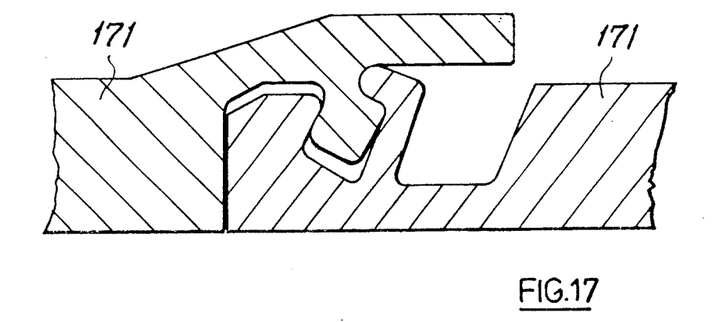
FIG. 17 is a cross section showing a fastener integral with rigid panels.
Figure 18:
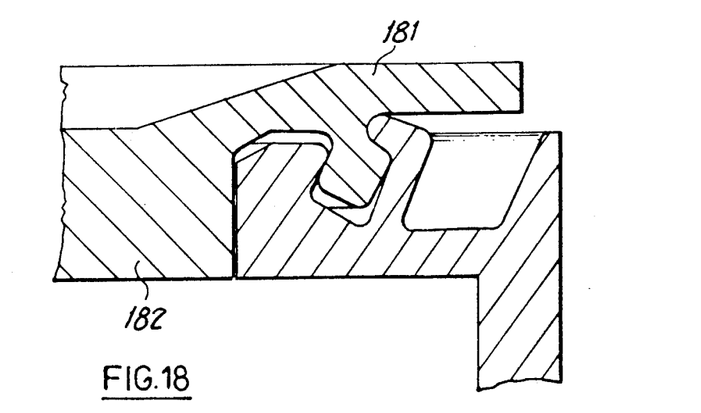
FIG. 18 is a cross sectional elevation of a can closure.

The fastener may be, in another aspect, elongate but rigid against twisting about its length. Such a fastener can be incorporated on the edges of, or even integral with—structural panels 171, beams and the like or, in circular form, as a can closure 181 as shown in FIGS. 17 and 18. Opening and closing of the fastener can be progressive, as for the flexible fasteners aforementioned, or the entire length of the recess 14 may be opened at once so that the entire length of the bead 13 comes out of it at once.

The fastener—in whatever form—may incorporate means such as ridge 12b, FIGS. 9 and 10, protecting the parts against unintentional deformation. Ridge 12b, of course, doubles as a presser foot guide as aforesaid.

Figure 1:
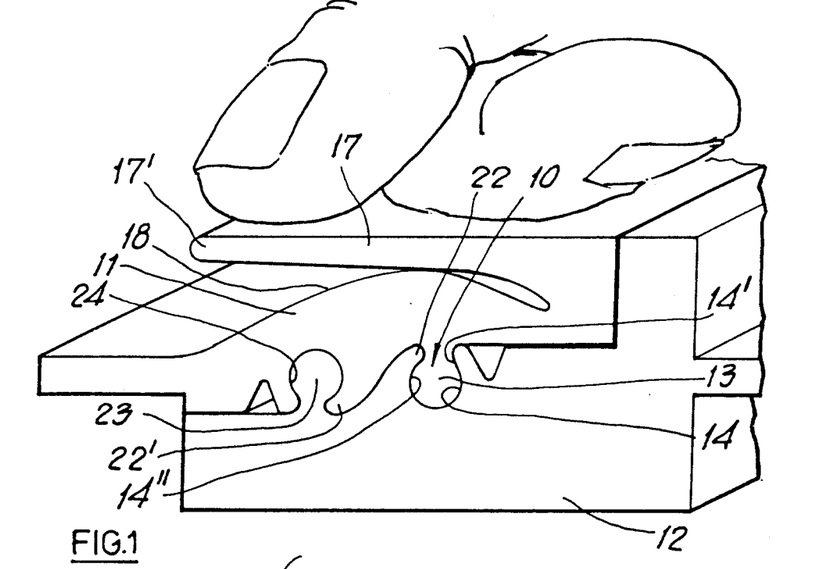
FIG. 1 is a perspective view showing particularly the cross section.
Figure 2:
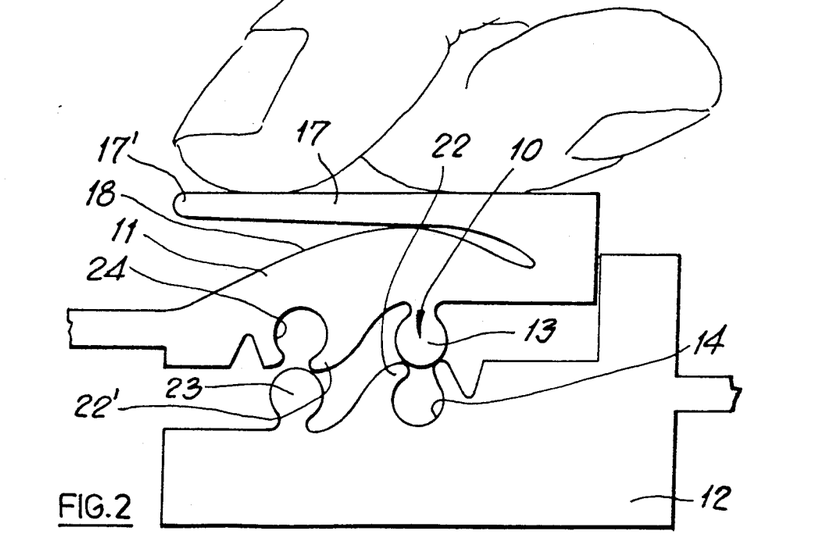
FIGS. 2 and 3 illustrate, in cross sectional form, the action of the engagement of the two mating parts.
Figure 3:
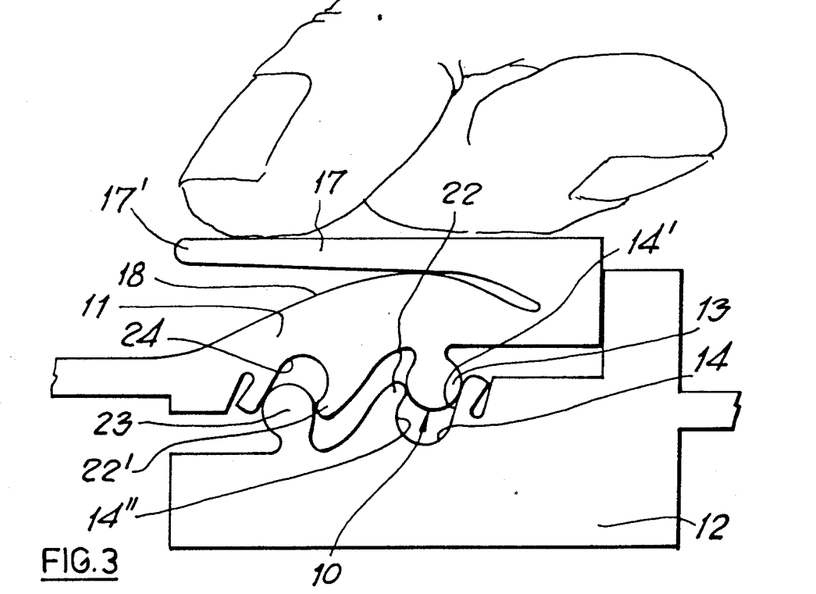

Reverting now to FIGS. 1 to 5, the fastener therein illustrated has mating, elongate parts 11 and 12 each including an additional bead 23 and groove or recess 24 which are also adapted to engage each other when fingertip pressure is applied, as illustrated in FIGS. 2 and 3, so that parts 11 and 12 are held in fastening engagement thereby as well as by the bead 13 and groove 14 as illustrated in FIG. 1.

Figure 4:
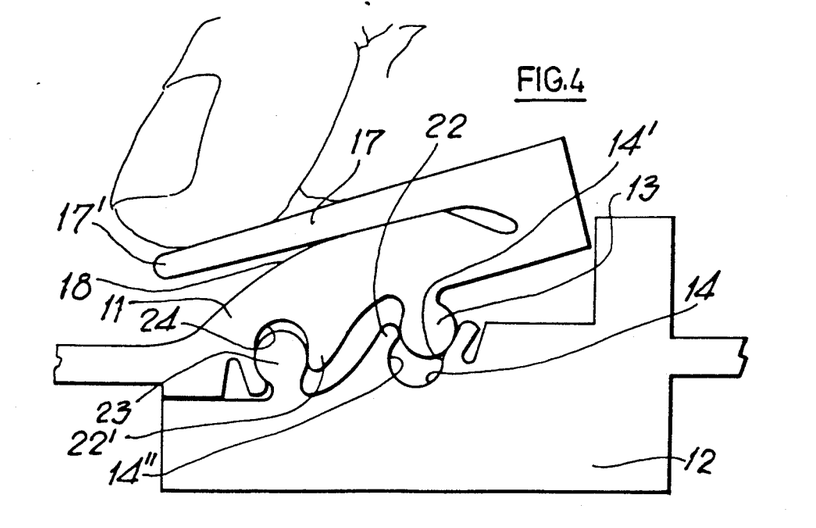
FIGS. 4 and 5 illustrate, in cross sectional form, the action of disengagement of the two mating parts.
Figure 5:
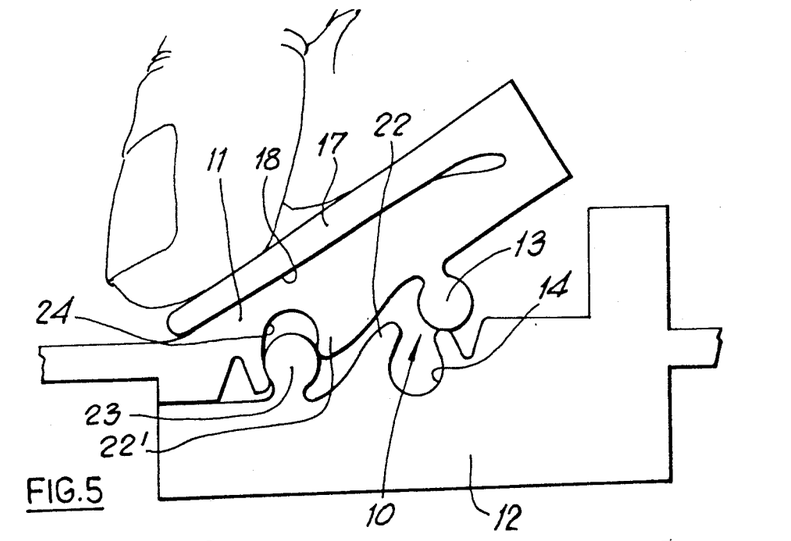

A latch 17 and cam 18 arrangement is provided for disengagement of the two halves. To disengage, latch 17 is depressed by applying fingertip pressure and pivots around cam 18 until beads 13 and 23 are separated from grooves 14 and 24 and the fastener opened, as illustrated in FIGS. 4 and 5.

The parts 11 and 12 are made of flexible material such as extruded polyamide, polyester or other polymer which allows for pivoting and twisting of beads 13 and 23, grooves 14 and 24, latch 17 and cam 18 when engaging and disengaging the two mating parts, as illustrated in FIGS. 2, 3, 4 and 5.

In use in, say, a fastener for clothing, replacing the conventional slide type fastener, the parts 11 and 12 can only be fastened by joining the parts at either end and by applying fingertip pressure in continuous motion from end to end. Alternatively, unfastening the two mating parts 11 and 12 can only be started by depressing the latch 17 at either end, whichever is the most convenient, and by applying fingertip pressure to latch 17 in a continuous motion the full length of the fastener.

The two parts are held together by interlocking beads 13 and 23 and grooves 14 and 24 and which form hook type arrangements 22 and 22' and when engaged can form a snap fit, as illustrated in FIG. 1.

Closing of the fastener beings at one end, or the other, with beads 13 and 23 being inserted into grooves 14 and 24, when fingertip pressure is applied and the fingertip is run from one end to the other, with continuous pressure being applied, and the two mating parts 11 and 12 snap into engagement, as illustrated in FIGS. 2 and 3.

Opening of the fastener beings at one end, or the other, with fingertip pressure being applied to latch 17 and latch 17 pivots around cam 18, thus allowing beads 13 and 23 to separate from grooves 14 and 24, as illustrated in FIGS. 4 and 5.

Whilst, as noted above, parts 11 and 12 may be of flexible material, the degree of flexibility of the material will be dependent upon the usage for which the fastener is required. Extruded arrangements may have parts of the cross section of rigid, other parts of flexible extrudate, so that a fastener part may be made integral with, say, a building panel. Extruded arrangements may be of any extrudable material, for example, aluminium, which is compatible with the flexibility requirements. Non-extrudable materials can alternatively be moulded or shaped as by routing or in any other convenient way.

Figure 19:
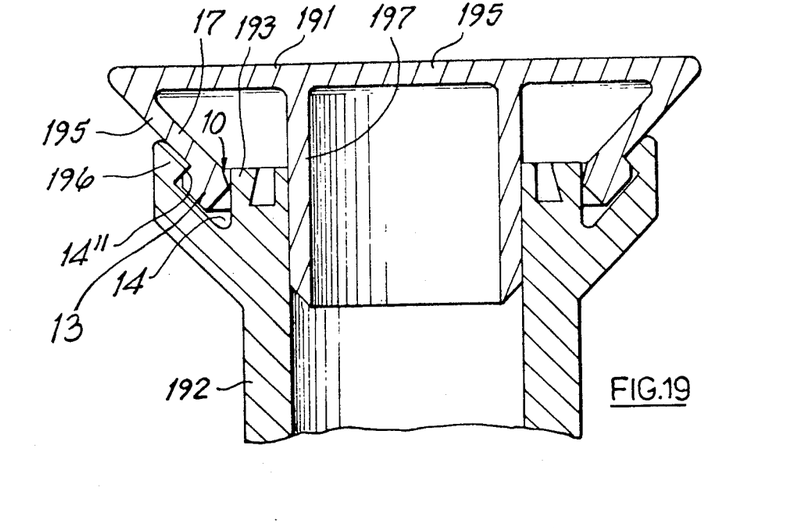
FIG. 19 is a section through another can closure.

With a flexible arrangement, it may be noted that it is also possible to provide non-rectilinear extrusions or mouldings so that the fasteners can follow a circular, elliptical or other curved path such as might be useful e.g. for the closures of FIGS. 18 and 19. A can closure disc 182, FIG. 18, is provided on its rim 181 with one part of the fastener, the can being provided with the other part. This arrangement will clearly be more useful with plastics material can closures which have inherent flexibility, so that they can be bent locally out of engagement with the rim of the can.

A drum or canister or even a necked bottle closure 191 is shown in diagrammatic section in FIG. 19 in which there is a recess 14 on the rim or neck of the container 192 and a bead 13 on the closure 191. The recess 14 has an entrance 10 for the bead which is smaller than the bead cross section whereby to retain the bead in the recess against pulling the closure 191 away from the container 192. The recess 14 is bounded at inner radius, however, by a wall 193 which is flexible and which is segmented if necessary to accommodate any change in peripheral dimension occasioned by radial flexing. The bead 13 is on a web 195 which in cross section is seen as a lever 17 fulcrummed on the outer edge 196 of the rim or neck. The closure 191 has an inner seal or guide 197 which fits into the rim or neck and the whole closure 191 is flexible such that, closed, downward pressure on the centre 191' of the closure 195 pivots the lever 17 to cause the bead 13 to push the wall 193 towards the centre, the seal or guide descending somewhat into the container. The bead 13 in this movement comes away from the radially outer, inwardly facing wall 14" of the recess 14. The wall 193, once the bead 13 is clear of it, snaps back to hold the bead 13 clear of the recess. Release of pressure at the middle 195 of the closure 191 allows the springiness of the lever 17 to lift the closure, and it can now be taken off. Replacement is simply a matter of pushing it downwardly so that the bead 13 pushes the wall 193 inwardly to open the mouth 10 of the recess 14 to admit the bead 13, whereupon the wall 193 snaps back into place to lock the closure on to the rim.

Figure 20:
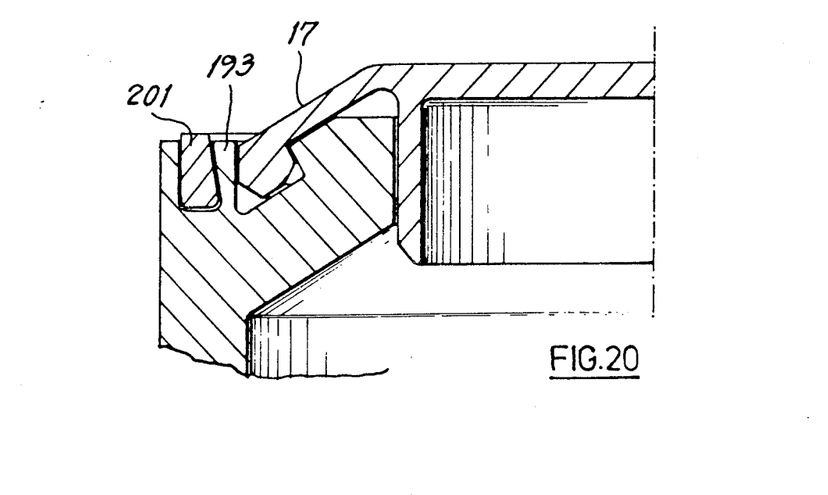
FIG. 20 is another section.

FIG. 20 shows another arrangement in section. This can be regarded as an alternative form of cannister closure to that shown in FIG. 19, in which the lever 17 is arranged in the opposite sense so that the wall 193 is now at outer radius. Alternatively, this FIG. 20 may be viewed as a section of an elongate strip fastener which may be straight or curved. In any event, a removable fillet or locking strip 201 may be inserted in the space beyond the movable wall 193 to stop it moving. In a cannister closure this would act as a guard against accidental opening in transit and storage. The fillet or locking strip 201 could be a tear-off and throw-away member or it could be retainable for relocking the arrangement. A similar device could be used in connection with the embodiment of FIG. 9 where the locking strip would fit between the ridge 12b and the movable wall 14' of the recess 14 to prevent the recess 14 opening.

For conventional situations where airtightness and watertightness are required, the fastener, being continuous in nature rather than comprised of individual interlocking parts of segments spaced apart (however closely) along the fastener, is ideal. Additional, e.g. labyrinth, seals can be built into the cross section if desired.

Figure 6:
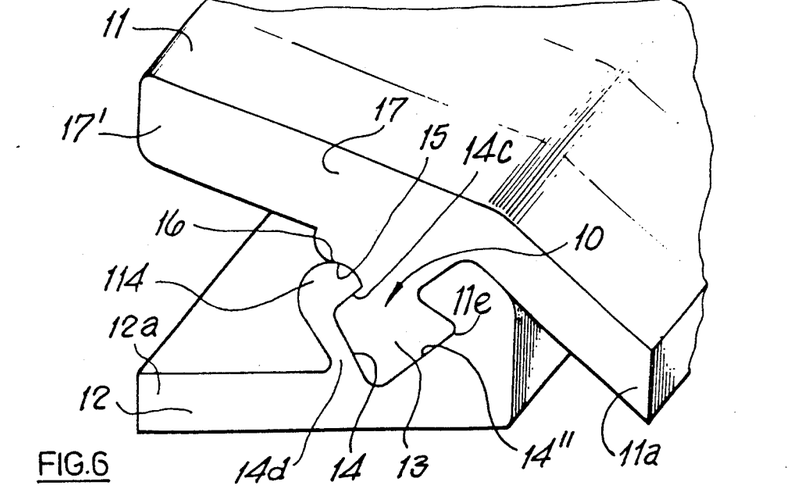
FIG. 6 is a perspective view showing essentially, however, the cross section of the two parts of a fastener.

FIGS. 6 and 8 illustrate a second series of profiled fastener designs according to the invention having first and second mating parts 11,12 of which the first part 11 has a bead and the second part 12 has a deformable recess 14, deformation of which permits lateral insertion of and removal of the bead 13.

The first part 11 comprises a lever which rocks with regard to the second part 12, rocking of which causes the bead 13 to deform the recess 14 to permit removal of the bead 13.

The lever 11 rocks on a deformable part 114 of the recess.

The recess 14 comprises a face 14" mating with a face 11e of the bead 13 opposite a wall of the recess 14—the deformable part 14" constituting the wall—which bends away from said recess face 114 to permit the said bead face 11e to slide thereover and out of the recess 14.

The two parts 11,12 have complementary surfaces 15,16 and are mutually deformable to bring said complementary surfaces 15,16 into and out of mutual contact, the one (in this case the surface 15 on part 11) moving by a combination of rolling and sliding on the other (surface 16 on part 12) to effect insertion of and removal of the bead 13 with regard to the recess 14.

Each part 11,12 has an attachment selvedge 11a,12a for attaching to components, e.g. edges of a garment such as edges of a jacket or fly, to be fastened together by the fastener. The arrangement is such that with the fastener closed by the first and second parts 11,12 being interengaged with the bead 13 latched in the recess 14, tension between the said attachment selvedges 11a,12a confirms the inter-engagement. The bead 13 can only come out of the recess 14 if the recess 14 is opened, which is to say, if the wall 114 is deflected to the left as viewed in the drawings. Tension between the attachment selvedges 11a,12a, however, tends to draw the selvedges into a common plane, if they are not in one already, which will tend not to deflect this wall 114 to the left but lock the two parts 11,12 even more firmly together.

The bead 13 comprises an essentially wedge shaped wall from the said first part 11 joining said first part 11 at its narrow end. Said second part 12 includes the wall 114 terminating in a lip 14c and capable of flexure at its root 14d, which forms one side of the recess 14. The root 14d is made of relatively shallow cross section to be more flexible than the rest of the part. It must be borne in mind, however, that the fastener as a whole will generally speaking need to be flexible so as to bend and twist in use, this without popping open under normal bending and twisting forces.

FIG. 7 illustrates a fastener of which the wall 114 is segmented. This has the effect that when the fastened fastener is bent or twisted—as it will be in use especially in garments due to normal and abnormal body movements—the adjacent segments do not have any effect on each other and so do not tend to undo the fastener. Moreover, the fastener can be fastened (or unfastened) part way along without any tendency to propagate the closure or unfastening further along.

The fastener illustrated in FIGS. 6 to 8 is easily openable and closable without the aid of a slider (although a slider could be used if desired) when made of material sufficiently flexible to enable it to be used as a garment closure, yet is adequately resistant to opening under forces ordinarily experienced in normal use. Opening and closing is effected by finger pressure rocking the one part on the other to open the latch, permitting withdrawing the bead. The opening and closing movement will be progressive along the fastener, as with regular metal zip fasteners, and facilitated by some twisting of one or both parts.

It will be seen that such rocking by finger pressure can be effected from either side of the fastener, so that the fastener can be used with either the part 11 or part 12 as the accessible part, i.e. to the outside of a garment.

The bead 13 could be arranged on the part 12, the recess on the part 11 if desired.

In any event, mating faces can be coated to improve sealant qualities of the fastener.

It will be appreciated that it is not intended to limit the invention to the above example only, many variations, such as might readily occur to one skilled in the art, being possible, without departing from the scope thereof as defined by the appended claims.

I claim:

1. A profiled bead and recess fastener comprising mating, complementary parts of which one part has a recess and the other part has a bead which engages in the recess to maintain the fastener closed against tension forces so directed as to tend to separate the two parts, the recess having in cross section, an entrance for the bead, which is smaller in cross section than the bead cross section whereby to retain the bead in the recess, the cross section of said entrance being adjustable by local elastic deformation to permit the bead to enter or leave the recess laterally, such local deformation to permit the bead to leave the recess being caused by flexure of one side of the recess by the bead whilst the bead comes out of contact with the other side of the recess without applying tension forces between the two parts.

2. A fastener according to claim 1, in which such flexure is effected by finger pressure on the bead part.

3. A fastener according to claim 2, in which said finger pressure causes the bead part to rock on the recess part to press the bead against the said one side of the recess.

4. A fastener according to claim 2, in which said finger pressure causes the bead part to slide on the recess part to press the bead against the said one side of the recess.

5. A fastener according to claim 1, in which the bead and entrance to the recess are so shaped that pushing the bead towards the recess against the said entrance opens the entrance to admit the bead.

6. A fastener according to claim 1, in which at least parts which move over each other in the actions of opening and closing have low friction.

7. A fastener according to claim 1, which is an elongate, flexible fastener with a continuous, uniform cross section over a substantial portion of the length of the fastener, opening of which, after a start thereon by said recess deformation, is continued progressively over such length by pulling the two parts apart, the bead at the position where the fastener is half open holding open the entrance to the recess whereby the next adjacent bead portion can be pulled out.

8. A fastener according to claim 7, in which there is at least one break in the continuity of the cross section along the fastener whereby the said progressive opening is arrested.

9. A fastener according to claim 7, intended for use as closure for textiles, having attachment edges, one on each of said parts, for connecting to textiles.

10. A fastener according to claim 9, adapted for sewing to a textile, having a sewing guide.

11. A fastener according to claim 7, having two or more recesses and/or two or more beads, any one of which beads can be engaged in any one of which recesses, whereby to produce an adjustable width fastening.

12. A fastener according to claim 7, comprising auxiliary bead and recess means assisting in maintaining the fastener closed under tension forces but separable together with the first mentioned bead coming out of its recess.

13. A fastener according to claim 12, said auxiliary bead and recess means being readily engageable and forming pilot engagement means facilitating engaging the first mentioned bead with its recess.

14. A fastener according to claim 7, having slider means running along the fastener effecting said local elastic deformation.

15. A fastener according to claim 14, in which said slider means isolate the length of closed fastener on one side from the effect of the open fastener on the other side so as to maintain the slider closed on the said one side.

16. A fastener according to claim 1, which is an elongate flexible fastener which is segmented lengthwise so that the opening of any segment does not open the entrance of an adjacent segment sufficiently to allow the bead therein to come out.

17. A fastener according to claim 16, which is segmented lengthwise by notches.

18. A fastener according to claim 16, which is segmented lengthwise by inclusion of reduced modulus material.

19. A fastener according to claim 1, incorporating guard means protecting the parts against unintentional deformation.

20. A profiled bead and recess fastener comprising mating, complementary parts of which one part has a recess and the other part has a bead which engaged in the recess to maintain the fastener closed against tension forces so directed as to tend to separate the two parts, the recess having in cross section, an entrance for the bead, which is smaller in cross section than the bead cross section whereby to retain the bead in the recess, the cross section of said entrance being adjustable by local elastic deformation to permit the bead to enter of leave the recess laterally, such deformation comprising flexure of one side of the recess by the bead whilst the bead comes out of contact with the other side of the recess, said bead part comprising a lever which rocks on the recess part and carried the bead, such rocking urging the bead against said one side of the recess and out of contact with the other side of the recess whereby to adjust the cross section of the entrance so that the bead can be withdrawn, continued rocking then withdrawing the bead from the recess.

21. A fastener according to claim 20, in which said lever has a lever arm adapted to be pushed by finger pressure towards the recess part to effect the rocking which opens the entrance to the recess.

22. A fastener according to claim 20, in which said lever has a lever arm adapted to be lifted by finger pressure away from the recess part to effect the rocking which opens the entrance to the recess.

23. A profiled bead and recess fastener comprising mating, complementary parts of which one part has a recess and the other part has a bead which engages in the recess to maintain the fastener closed against tension forces so directed as to tend to separate the two parts, the recess having in cross section, an entrance for the bead, which is smaller in cross section than the bead cross section whereby to retain the bead in the recess, the cross section of said entrance being adjustable by local elastic deformation to permit the bead to enter or leave the recess laterally, such deformation comprising flexure of one side of the recess by the bead whilst the bead comes out of contact with the other side of the recess, said fastener being an elongate, flexible fastener with a continuous, uniform cross section, opening of which, after a start thereon by said recess deformation, is continued progressively by pulling the two parts apart, the bead at the position where the fastener is half open holding open the entrance to the recess whereby the next adjacent bead portion can be pulled out, said fastener having at least one lengthwise section at any part of which local elastic deformation to permit the bead to leave the recess laterally cannot be effected except by, at an adjacent part, the bead holding open the entrance to the recess, so that opening of the fastener cannot be started within said section.

* * * * *